Patented Jan. 24, 1950

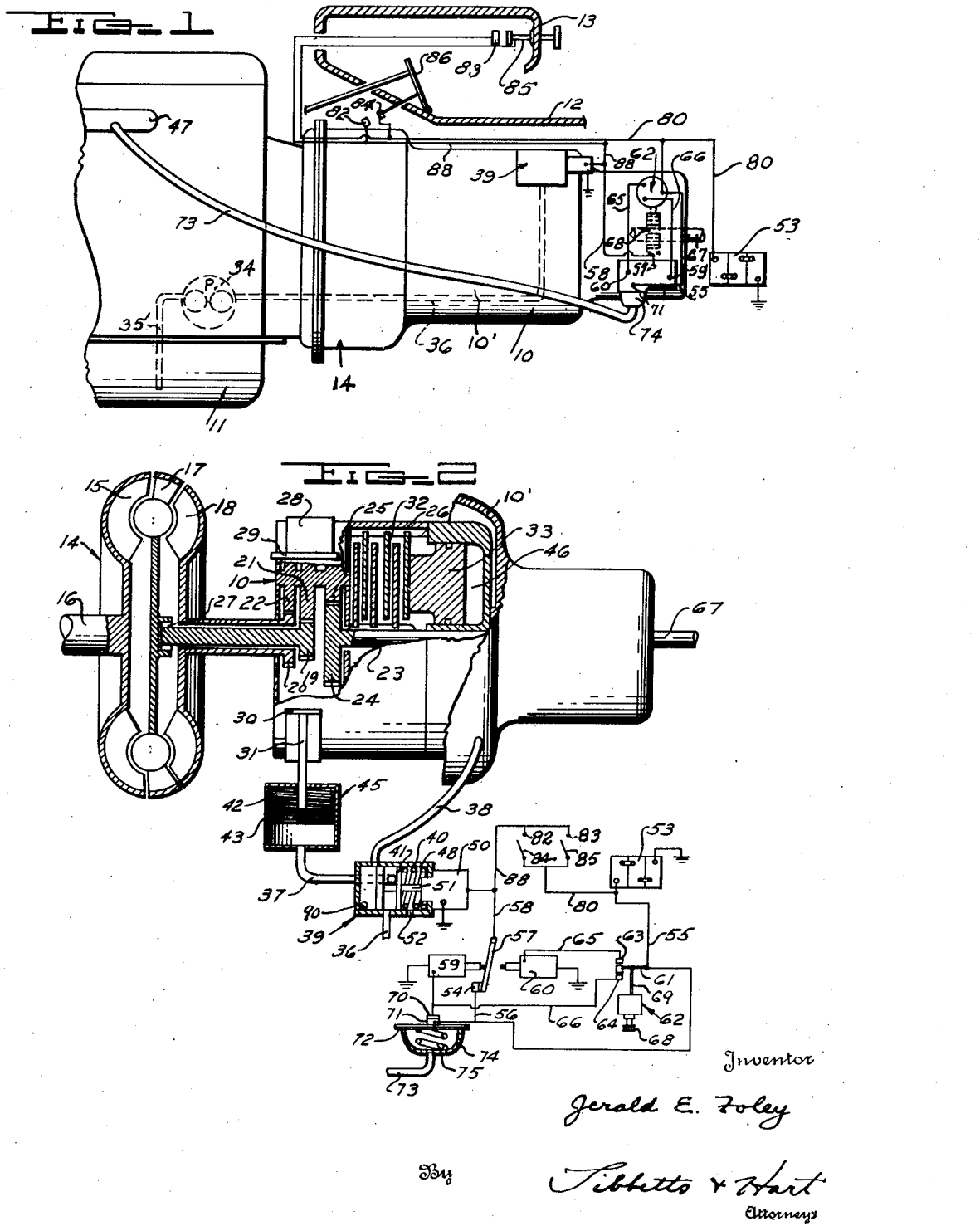

2,495,515

UNITED STATES PATENT OFFICE 2,495,515

TRANSMISSION CONTROL MEANS

Jerald E. Foley, Detroit, Mich., assignor to Packard Motor Car Company, Detroit, Mich., a corporation of Michigan Application February 1, 1946, Serial No. 644,681

12 Claims. (Cl. 74—472)

This invention relates to transmissions and more particularly to control means for semi-automatic motor vehicle transmissions.

In semi-automatic motor vehicle transmissions having a plurality of gear ratios, the ratio selection for the high speed drive is usually under control of a speed sensitive device. There are some vehicle operating conditions where the best mechanical advantage cannot be obtained with high speed gear ratio when established by the speed sensitive device, for example, when the vehicle speed causes shift into the high speed gear ratio while there is a high torque demand.

An object of this invention is to provide an automatic transmission of the character referred to in which a speed sensitive control for high speed gear ratio is overruled above the governed speed until the torque demand is below some predetermined value.

Another object of the invention is to use a multiple gear ratio transmission to the best mechanical advantage by preventing the normal automatic up-shift by a speed sensitive device until torque in an established gear ratio falls below a predetermined value.

Another object of the invention resides in the automatic control of a plural gear ratio motor vehicle transmission in which fuel intake manifold pressure is utilized to restrain shift from one gear ratio to a higher speed gear ratio by electromagnetic means responsive to vehicle speed while torque demand is above a predetermined value.

Other objects of the invention will appear from the following description taken in connection with the drawings, which form a part of this specification, and in which:

Fig. 1 is a side elevation of transmission incorporating the invention; and

Fig. 2 is a sectional view of the transmission with the control means shown schematically.

Numeral 10 represents generally a conventional type of vehicle transmission powered by a conventional internal combustion engine 11. The transmission is suitably supported beneath the vehicle floor 12 and a conventional instrument panel 13 overlies the forward end of the floor.

The transmission includes a fluid coupling 14 having an impeller 15, driven directly by the engine crankshaft 16, and runners 17 and 18 for driving plural gear ratio mechanism in the form of planetary gearing. Runner 17 has gear 19 fixed thereto and runner 18 has gear 20 fixed thereto, such gears meshing respectively with planet gears 21 and 22. A driven shaft 23 extends coaxial with the runners and carries gear 24 meshing with planet gear 25. Planet gears 21, 22 and 25 are formed as a unit or are fixed together and are rotatably mounted in carrier 26. Gears 20, 22, 25 and 24 provide the intermediate speed gear ratio drive and gears 19, 21, 25 and 24 provide the low speed gear ratio drive.

Retrograde rotation of the carrier must be stopped when the engine is operating to establish either the low or intermediate speed drive and the planetary gearing must be locked to rotate as a unit to establish direct or high speed drive. The primary runner 17 is effective to drive the low speed gear train when the coupling impeller is rotating at low engine speed and a conventional one-way clutch 27 is provided in the primary runner so that the secondary runner 18 can overrun the primary runner when the coupling speed is such that the secondary runner becomes the driver for the intermediate speed gear train. The gear ratio selector control system includes two selector devices.

The selector device for holding the carrier from retrograde rotation is shown as a brake band 28 encircling the carrier and anchored at one end to the transmission casing 10' by pin 29. The other end of the band has a flange 30 to which an actuator 31 is fixed.

The selector device for locking the planetary gearing to rotate as a unit is shown as a friction clutch having alternate plates 32 slidably splined to shaft 23 and the carrier. The plates are engaged by a pressure operated actuator 33.

Actuators 31 and 33 for the brake and clutch devices are under the control of a pressure fluid system consisting of an engine driven pump 34 having an intake 35 extending into oil in the crankcase, a main conduit 36, branch conduits 37 and 38 and a selector valve device 39 between the main conduit and the branch conduits. This valve device consists of a housing 40 projecting into the transmission casing 10' and containing a two flanged valve 41. Conduit 37 leads from the valve housing to a cylinder 42 housing a piston 43 to which brake actuator 31 is secured and spring 45 in the cylinder acts to move the piston to a position in which the brake band is released from the carrier 26. When fluid is allowed to flow into the cylinder by the valve device 39, the piston will be moved to engage the brake band with the planetary gearing carrier. Conduit 38 leads from the valve housing and communicates with chamber 46 in an end of the carrier in which actuator 33 is slidably mounted. When the valve device allows flow through conduit 38, fluid pressure will shift actuator 32 to engage the clutch and establish high speed gear ratio.

The pressure fluid system valve device is controlled by an electric circuit that in turn is controlled by an electromagnetic means. Spring 48 in the housing 40 is arranged to exert pressure against valve 41 to normally position it in a station where branch conduit 38 is open to main conduit 33, branch conduit 37 being open to vent 52. When the valve is in such position the brake device will be released and the clutch will be applied to the carrier so that the high speed gear ratio will be made effective. Solenoid 50 fits into the valve casing 40 and serves to actuate valve stem 51, when energized, to shift valve 41 to the right connecting conduit 36 with conduit 37, as shown in Fig. 2, and opening conduit 38 to vent 90 whereby the clutch device will be released and the brake device applied to the carrier to establish the drive in low or intermediate gear ratio as dictated by the fluid clutch.

The solenoid control circuit includes battery 53 connected with contact 54 by lines 55 and 56, master switch 57 and line 58. The master switch is controlled by electromagnetic means comprising two systems, having oppositely disposed electromagnets 59 and 60, adapted to be alternately energized by switch 61 connected with line 55 and operable by a speed sensitive device 62. Switch 61 is arranged between contacts 63 and 64, contact 63 being connected by line 65 with electromagnet 60 and contact 64 being connected by line 66 with electromagnet 59. The speed sensitive device may be of the flyweight governor type driven from vehicle tail shaft 67 by gearing 68 and operating an actuator 69 connected with switch 61. The arrangement is such that below a predetermined vehicle speed, 12 miles per hour for example, switch 61 will engage contact 64 and above such vehicle speed such switch will be moved to engage contact 63. Master switch 57 will be shifted into and out of engagement with contact 54 depending upon the governor selection of current flow to the electromagnets. When magnet 59 is energized the master switch will engage contact 54 completing the circuit to solenoid 50 which acts to position valve 41 in the station shown in Fig. 2 whereby the brake device is applied and the clutch device disengaged. When magnet 60 is energized switch 57 will be moved away from contact 54 thereby breaking the circuit to solenoid 50. Spring 48 is now free to move valve 41 to the left whereupon fluid flow to the brake device is cut off and conduits 36 and 38 are connected so that pressure fluid will engage the clutch device.

There are some vehicle operating conditions when this shift into high speed gear ratio is not desired if the most advantageous driving conditions are to be obtained. When high torque is required above the governed speed, geared drive instead of direct drive dictated by the speed sensitive device is most advantageous. It is proposed to achieve this result with the circuit and control described by restraining movement of the master switch out of solenoid energizing position by an auxiliary circuit controlled by engine operating conditions as reflected by pressure in the engine intake manifold. Lines 66 and 55 are connected respectively with contacts 70 and 71 and contact 71 is fixed to a movable switch member 72 in the form of a flexible diaphragm. Conduit 73 connects the engine fuel intake manifold 47 with the interior of casing 74 on which the diaphragm is fixed and spring 75 in the casing acts against the diaphragm to normally engage movable contact 71 with stationary contact 70. Thus, above a predetermined pressure in the manifold the circuit to electromagnet 59 will be maintained by this auxiliary circuit even though switch 61 has been shifted above the governed speed to energize electromagnet 60. Since flux density decreases rapidly with distance from the electromagnet, the master switch will be retained in contact with the electromagnet it is attracted to until the same is deenergized, and thus electromagnet 60 may be energized without drawing switch 57 away from electromagnet 59 so long as it remains energized. Vacuum or manifold pressure may thus be utilized for controlling the auxiliary circuit for maintaining low speed gear ratio in the transmission even though the speed sensitive device conditions the electromagnetic control means for shifting into a higher speed gear ratio.

Another auxiliary circuit is provided for overruling the main circuit and electromagnetic control means at the will of the driver. In such auxiliary circuit, line 80 is connected with line 55 and is connected with switches 84 and 85 and switch contacts 82 and 83 are connected with the solenoid 50 by line 88. Switch 84 is operated by the accelerator pedal 86 and is moved to engage contact 82 when the pedal is moved beyond wide open throttle position. Switch 85 is operable by the vehicle driver at the instrument panel 13 and may be moved to engage contact 83. These switches are in parallel in this auxiliary control circuit and either one may be actuated to energize the solenoid and cause the control valve to be shifted to cause engagement of the brake device when the main control system is in high speed gear ratio relation.

After high speed drive has been effected through engagement of clutch 32, the switch 57 cannot be shifted back to geared drive position while the vehicle is above the governed speed except through the closure of either of the switches 84 and 85.

It will be understood that various forms of the invention other than that described above may be used without departing from the spirit or scope of the invention.

What I claim is:

1. In a control system for selecting gear ratios in a vehicle transmission powered by an internal combustion engine having a fuel intake manifold, control devices operative to establish different gear ratios in the transmission, a pressure fluid system for actuating said control devices, a valve in said system movable to two stations for selecting fluid actuation of the control devices, means normally positioning said valve in one station, an electric system for shifting the valve to the other station when energized, a switch in said system, electromagnetic means for shifting the switch, a governor operable to control the electromagnetic means, and means responsive to pressure in the intake manifold for restraining movement of the switch in response to the governor controlled electromagnetic means.

2. In a vehicle transmission having two gear ratios, control devices selectively operable for establishing each gear ratio, a pressure fluid system for actuating said devices, a selector valve in said system movable to two stations for selecting fluid flow to said devices, means urging said valve to one station, electromagnetic controlled means operable to shift the valve to the other station, governor means operative above a predetermined vehicle speed for conditioning the electromagnetic means for shifting the valve to effect a higher speed gear ratio, and means independent of the governor means for rendering the lower speed gear ratio effective, said independent means being rendered ineffective by vacuum below a predetermined value.

3. In a multiple gear ratio transmission for vehicles, a gear ratio control means comprising individual control devices for effecting drive through the several gear ratios, a pressure fluid system for actuating said control devices, a valve in said system movable to different stations for selecting fluid actuation of the control devices, means urging said valve to one station, an electric system for shifting the valve to another station, an electromagnetic system controlling said electric system, control means for the electromagnetic system including governor responsive means, effective above a predetermined vehicle speed to render a portion of the electromagnetic system ineffective, and vacuum influenced means effective in a high pressure range to restore the effectiveness of the said portion of the electromagnetic system.

4. In control means for selecting gear ratios in a vehicle transmission powered by an internal combustion engine, devices operable to establish different gear ratios in the transmission, a pressure fluid system operative to selectively control said devices, a valve in said system normally in high speed gear ratio effecting position, a solenoid operative to shift the valve to a lower speed gear ratio effecting position when energized, an electric circuit connected with the solenoid including a master switch, an electromagnetic system for shifting said switch in response to a predetermined vehicle speed, and means restraining shifting of the master switch from circuit forming position under certain engine operating conditions.

5. In a control means for selecting gear ratios in a vehicle transmission powered by an internal combustion engine, devices operable to establish different gear ratios in the transmission, a pressure fluid system operative to selectively control said devices, a valve in said system normally held in high speed gear ratio effecting position, a solenoid operative to shift the valve to a lower speed gear ratio effecting position when energized, an electric circuit connected with the solenoid including a master switch, an electromagnetic system for shifting the master switch including a selector switch, governor means for shifting said selector switch at a predetermined vehicle speed, and means restraining deenergizing of the electromagnetic system when holding the master switch in circuit making position under certain engine operating conditions.

6. In control means for selecting gear ratios in vehicle transmissions, devices operable to establish different gear ratios in the transmission, a pressure fluid system operative to selectively control said devices, a valve in said system normally held in high speed gear ratio position, a solenoid operative to shift and hold the valve in a lower speed gear ratio position when energized, an electric circuit connected with the solenoid including a shiftable master switch, dual electromagnetic systems for shifting the master switch, a selector switch for the electromagnetic systems, and governor means operable above a predetermined vehicle speed for actuating said selector switch to energize the electromagnetic system for moving the master switch out of circuit making position.

7. In control means for selecting gear ratios in vehicle transmissions, devices operable to establish different gear ratios in the transmission, a fluid pressure system operative to selectively control said devices, a flow control valve in the system, spring means normally maintaining the valve in position to make the device for establishing high speed gear ratio effective, a solenoid for shifting the valve to a position making the device for establishing a lower speed gear ratio effective when energized, an electric circuit connected with the solenoid, a master switch in said circuit, two electromagnetic means selectively operable to control shifting of said switch, and a switch selectively controlling energizing of said two electromagnetic means, and means responsive to a predetermined vehicle speed for shifting said switch controlling the electromagnetic means.

8. In a vehicle transmission of the planetary type having brake and clutch devices for establishing two gear ratios, control means for the devices comprising a fluid pressure system operative to selectively control said devices, a flow control valve in the system, spring means normally maintaining the valve in position to cause fluid pressure engagement of the clutch device, a solenoid operative when energized to shift said valve to cause fluid pressure engagement of the brake device, an electric circuit connected with the solenoid including a make and break switch, electromagnetic means controlled to hold the switch in circuit making position below a predetermined vehicle speed and to shift the switch into circuit breaking position above such vehicle speed, and an auxiliary circuit for holding the switch in circuit making position under certain engine operating conditions.

9. In control means for selecting gear ratios in a vehicle transmission powered by an engine having an intake manifold, devices operable to establish two gear ratios in the transmission, control means for the devices comprising a fluid pressure system operative to selectively control said devices, a flow control valve in the fluid system, spring means normally maintaining the valve in position to cause engagement of the high speed gear ratio control device, a solenoid operative when energized to shift said valve to cause engagement of the low speed gear ratio control device, an electric circuit connected with the solenoid including a master switch, two electromagnetic circuits for shifting said master switch, a governor controlled switch for selectively establishing the electromagnetic circuits, the electromagnetic circuit for moving the master switch to circuit closing position being energized below a predetermined vehicle speed, and the electromagnetic circuit for moving the master switch to circuit breaking position being energized above the predetermined speed, an auxiliary circuit connected with the solenoid circuit making electromagnetic system, a spring engaged switch in the auxiliary circuit, and a connection between the intake manifold and the switch in the auxiliary circuit whereby pressure in the manifold below a predetermined value will act on the switch to break the auxiliary circuit and thereby release the master switch.

10. In a vehicle transmission of the planetary gear type having brake and clutch devices for establishing two gear ratios, control means for the devices comprising a fluid pressure system operative to selectively control said devices, a flow control valve in the system, spring means normally maintaining the valve in position to cause fluid pressure engagement of the clutch device, a solenoid operative when energized to shift said valve and cause fluid pressure engagement of the brake device, an electric circuit connected with the solenoid including a make and break switch, electromagnetic means under control of a governor for holding the switch in circuit making position below a predetermined vehicle speed and for shifting the switch into circuit breaking position above such vehicle speed, and an auxiliary circuit controlled by the will of the vehicle driver and connected with the solenoid.

11. In a vehicle transmission of the planetary gearing type having a brake device for establishing a low speed gear ratio and a clutch device for establishing a high speed gear ratio and powered by an internal combustion engine having a fuel intake manifold, control means for the devices comprising a fluid pressure system operative to selectively control said devices, a flow control valve in the fluid system, spring means normally maintaining the valve in position to cause fluid pressure engagement of the clutch device, a solenoid operative when energized to shift said valve and cause fluid pressure engagement of the brake device, an electric circuit connected with the solenoid, including a master switch for making and breaking the circuit, two electromagnetic means on opposite sides of the master switch for controlling its position, a switch common to the two electromagnetic means and shiftable to selectively energize the same, governor means driven by the vehicle and operative to control the electromagnetic means switch, said switch energizing the electromagnetic means for moving the master switch into circuit making position below a predetermined speed, an auxiliary circuit for the electromagnetic means operative to move the master switch into circuit making relation, a diaphragm switch in the auxiliary circuit, spring means normally closing the diaphragm switch, and a connection between the diaphragm switch and the engine intake manifold whereby pressure at a value below maximum high pressure will move the diaphragm switch into circuit breaking position.

12. In a control system for selecting gear ratios in a vehicle transmission powered by an internal combustion engine, fluid-operated devices operative to establish different gear ratios in the transmission, a selector valve for the fluid-operated devices, a solenoid for actuating the selector valve, an electric circuit connected to the solenoid, a second electric circuit connected to the solenoid around the first circuit, electromagnetic means controlling making and breaking of the first-mentioned circuit, speed sensitive switch means controlling the operation of the electromagnetic means, and switch means controlled as a function of the torque demand on the engine for establishing the second circuit around the speed sensitive switch means to overrule breaking of the circuit by the said speed sensitive switch.

JERALD E. FOLEY.

REFERENCES CITED

The following references are of record in the file of this patent:

UNITED STATES PATENTS

| Number | Name | Date |
|---|---|---|
| 1,813,731 | Fleischel | July 7, 1931 |
| 1,839,145 | Forichon | Dec. 29, 1931 |
| 1,893,644 | Fleischel | Jan. 10, 1933 |
| 2,210,239 | Hale | Aug. 6, 1940 |
| 2,251,625 | Hale | Aug. 5, 1941 |
| 2,260,406 | Roche | Oct. 28, 1941 |
| 2,380,491 | Ball | July 31, 1945 |